United States Patent
Dong

(10) Patent No.: US 12,192,115 B2
(45) Date of Patent: Jan. 7, 2025

(54) NETWORK ALLOCATION VECTOR SETTING METHOD AND APPARATUS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 391 days.

(21) Appl. No.: 17/635,299

(22) PCT Filed: Aug. 15, 2019

(86) PCT No.: PCT/CN2019/100828
§ 371 (c)(1),
(2) Date: Feb. 14, 2022

(87) PCT Pub. No.: WO2021/026897
PCT Pub. Date: Feb. 18, 2021

(65) Prior Publication Data
US 2022/0360543 A1   Nov. 10, 2022

(51) Int. Cl.
*H04L 47/78* (2022.01)
*H04L 47/70* (2022.01)
*H04L 47/762* (2022.01)

(52) U.S. Cl.
CPC .......... *H04L 47/781* (2013.01); *H04L 47/762* (2013.01); *H04L 47/826* (2013.01)

(58) Field of Classification Search
CPC ... H04L 47/781; H04L 47/762; H04L 47/826; H04L 5/0098; H04W 74/0816; H04W 48/16; H04W 74/08; H04W 80/02; H04B 17/309
See application file for complete search history.

(56) References Cited

U.S. PATENT DOCUMENTS

| | | | |
|---|---|---|---|
| 10,244,536 B1 | 3/2019 | Jiang et al. | |
| 11,818,799 B1* | 11/2023 | Chu | H04W 80/02 |
| 2014/0010089 A1* | 1/2014 | Cai | H04W 48/16 |
| | | | 370/241 |
| 2017/0041953 A1* | 2/2017 | Zhou | H04W 74/0816 |
| 2019/0045035 A1* | 2/2019 | Shinohara | H04W 74/08 |

FOREIGN PATENT DOCUMENTS

| | | | |
|---|---|---|---|
| CN | 105025491 A | * | 11/2015 |
| CN | 105230106 A | | 1/2016 |
| CN | 106658751 A | | 5/2017 |

(Continued)

OTHER PUBLICATIONS

Yunbo Li, Yuchen Guo, etc., "Channel Access in Multi-band operation", Shenzhen, China; Type-A (2019).

(Continued)

*Primary Examiner* — Ayaz R Sheikh
*Assistant Examiner* — Louis Samara
(74) *Attorney, Agent, or Firm* — Volpe Koenig

(57) ABSTRACT

A network allocation vector setting method including: detecting each channel of n channels to determine m occupied busy channels of the n channels and a time duration in which each busy channel is occupied; and setting network allocation vectors of at least m busy channels of the n channels according to l time durations.

9 Claims, 4 Drawing Sheets

---

Detect each channel of $n$ channels to determine $m$ occupied busy channels of the $n$ channels and a time duration in which each busy channel is occupied — S1

Set network allocation vectors of at least the $m$ busy channels of the $n$ channels according to $l$ time durations, where $1 \leq l \leq n$ — S2

(56) References Cited

FOREIGN PATENT DOCUMENTS

| | | | |
|---|---|---|---|
| CN | 107645788 A | 1/2018 | |
| EP | 3205137 B1 * | 8/2018 | ........... H04B 17/309 |
| JP | 2016541158 A * | 12/2016 | |
| JP | 2017513328 A * | 5/2017 | |
| JP | 2017514350 A * | 6/2017 | |
| WO | WO-2016010882 A1 * | 1/2016 | ........... H04L 5/0098 |
| WO | WO-2017213759 A1 * | 12/2017 | ............. H04B 17/15 |

OTHER PUBLICATIONS

Pan Su, Liu Shengmei, "A Multi Channel MACP Protocol with Load Sensing for Ad Hoc Networks", Journal of the Chinese Academy of Electronic Sciences, vol. 2—No. 6, pp. 568-572; Type-A (2018).

* cited by examiner

NETWORK ALLOCATION VECTOR SETTING METHOD AND APPARATUS

CROSS REFERENCE TO RELATED APPLICATION

The present application is a U.S. National Phase of International Patent Application Serial No. PCT/CN2019/100828 filed on Aug. 15, 2019. The entire contents of the above-cited application are hereby incorporated by reference in their entirety for all purposes.

BACKGROUND

As for Wi-Fi network, a terminal may access channels in different frequency bands, but it can only access one channel at a certain moment. Before accessing a certain channel, it is needed to check whether the channel is idle. When the channel is idle, it may be accessed. When the channel is busy, it is needed to wait for a period of time before trying to randomly access the channel again through competition. In the related art, a network allocation vector (NAV) is set according to a detection result of the channel, and waiting time for retrying to access the channel is determined according to the network allocation vector.

Currently, with the development of communication technology, Wi-Fi technology allows the terminal to access a plurality of channels simultaneously, but the terminal still sets the network allocation vector based on a condition of accessing one channel, which fails to adapt to a scenario where the terminal simultaneously accesses the plurality of channels.

SUMMARY

According to a first aspect of the disclosure, a network allocation vector setting method is provided, and is applicable to a terminal. The terminal is applicable to accessing n channels simultaneously, and each channel is in a different frequency band. The method includes:

detecting each channel of the n channels to determine m occupied busy channels of the n channels and a time duration in which each busy channel is occupied; and setting network allocation vectors of at least the m busy channels of the n channels according to l time durations, where $1 \leq l \leq n$.

According to a second aspect of the disclosure, an electronic device is provided, and includes:

a processor; and a memory used for storing an instruction executable by the processor.

The processor is configured to realize the method according to any one of the above examples.

According to a third aspect of the disclosure, a non-transitory computer readable storage medium is provided, and stores a computer program thereon. The program, when being executed by a processor, realizes steps in the method according to any one of the above examples.

BRIEF DESCRIPTION OF THE DRAWINGS

In order to clearly describe technical solutions in examples of the disclosure, drawings that need to be used in the description of the examples will be briefly introduced. Apparently, the drawings in the following description are some examples of the disclosure. For those of ordinary skill in the art, other drawings can be obtained based on these drawings without creative labor.

FIG. 9 is a schematic block diagram of a network allocation vector setting module illustrated according to an example of the disclosure;

FIG. 10 is a schematic block diagram of another network allocation vector setting module illustrated according to an example of the disclosure;

FIG. 11 is a schematic block diagram of yet another network allocation vector setting module illustrated according to an example of the disclosure; and FIG. 12 is a schematic block diagram of an apparatus for network allocation vector setting illustrated according to an example of the disclosure.

DETAILED DESCRIPTION

Technical solutions in examples of the disclosure will be clearly and completely described in conjunction with drawings in the examples of the disclosure. Apparently, the described examples are a part of the examples of the disclosure, rather than all of the examples. Based on the examples in the disclosure, all other examples obtained by those of ordinary skill in the art without creative labor shall fall within the protection scope of the disclosure.

Figure 1:
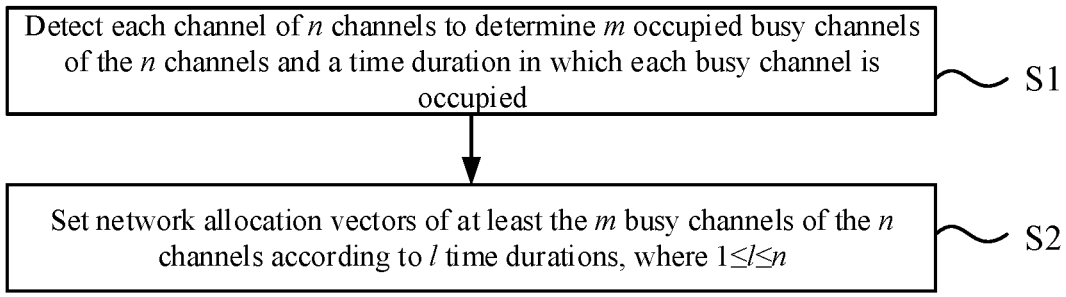
FIG. 1 is a schematic flow chart of a network allocation vector setting method illustrated according to an example of the disclosure.

FIG. 1 is a schematic flow chart of a network allocation vector setting method illustrated according to an example of the disclosure. The network allocation vector setting method illustrated by the example may be applicable to a terminal. The terminal may be an electronic device such as a mobile phone, a tablet computer, a wearable device, etc., and the terminal may perform communication based on a Wi-Fi network.

The Wi-Fi network may have n channels, and the terminal may access the n channels simultaneously and may also access one channel each time. The technical solution is illustratively described in the following example under a condition that the terminal accesses the n channels simultaneously. Each channel of the n channels may be in a different frequency band and may also be in a same frequency band. For instance, taking n=3 for example, the frequency bands of 3 channels may be 2.4 GHz, 5.8 GHz and 6-7 GHz respectively.

As shown in FIG. 1, the network allocation vector setting method may include the following steps. In step S1, each channel of the n channels is detected to determine m occupied busy channels of the n channels and a time duration in which each busy channel is occupied. Then in step S2, network allocation vectors of at least the m busy channels of the n channels are set according to l time durations, where $1 \le l \le n$. For example l=m.

In an example, the terminal may detect each channel of the n channels simultaneously accessed. For instance, it may perform detection under each channel respectively by calling a physical layer entity through a MAC (Media Access Control) layer entity. For a certain channel, an energy detection (ED) value of the channel may be obtained through detection, and when the energy detection value is larger than an energy threshold value corresponding to the channel, it may be determined that the channel is occupied by other device and the channel is a busy channel. In general, a unit of the energy detection value is dBm, and energy threshold values may be different under different channel bandwidth and different frequency bands. For instance, the energy threshold value in a channel bandwidth of 20 MHz under the frequency band of 2.4 GHz is −82 dBm, and the energy threshold value under a frequency band of 40 MHz is −79 dBm.

In the n channels, there may be the m busy channels, where $1 \le m \le n$. That is, for the n channels, under a condition that one busy channel or a plurality of channels exits in the n channels, the network allocation vectors of at least the m busy channels of the n channels may be set according to the l time durations. When m=0, that is, under a condition that no busy channel exits in the n channels, the terminal may directly occupy each channel, so the network allocation vectors do not need to be set.

For each busy channel, a physical layer (PHY) protocol data unit (short as PPDU) transmitted by the busy channel may be further obtained, and a part of legacy signal (short as L-SIG) of the protocol data unit is parsed so as to determine a sending length of a data frame. The time duration in which the busy channel is occupied may be determined based on the sending length of the data frame.

According to the examples of the disclosure, for the terminal that can access the n channels simultaneously, each channel of the n channels may be detected, so as to determine the m occupied busy channels of the n channels and the time duration in which each busy channel is occupied, and then setting the network allocation vectors of the at least m busy channels of the n channels according to the l time durations.

Under a scenario that the terminal accesses the n channels simultaneously, the network allocation vectors of the at least m busy channels of the n channels may be set according to the l time durations, which is conducive to ensuring that the network allocation vector set for each busy channel is matched with the time duration in which each busy channel is occupied, so it can be ensured that the terminal retries to access a channel according to the network allocation vectors and may timely access each channel for communication, and that a relatively high utilization rate of a plurality of channels as a whole is achieved.

Optionally, the terminal performs asynchronous communication through the n channels. Asynchronous communication refers to that a receiving end receives data under a plurality of channels at different time points. The terminal in the example may serve as a sending end to send the data to one or a plurality of receiving ends, and may also serve as the receiving end to receive the data sent by other transmitting ends.

In an example, the terminal may perform asynchronous communication through the n channels. For instance, to take n=3 for example, the terminal may access channels of 3 frequency bands simultaneously. When the terminal serves as the sending end, operations of sending the data on each channel may be performed asynchronously; and when the terminal serves as the receiving end, operations of receiving the data on each channel may be performed asynchronously as well.

Figure 2:
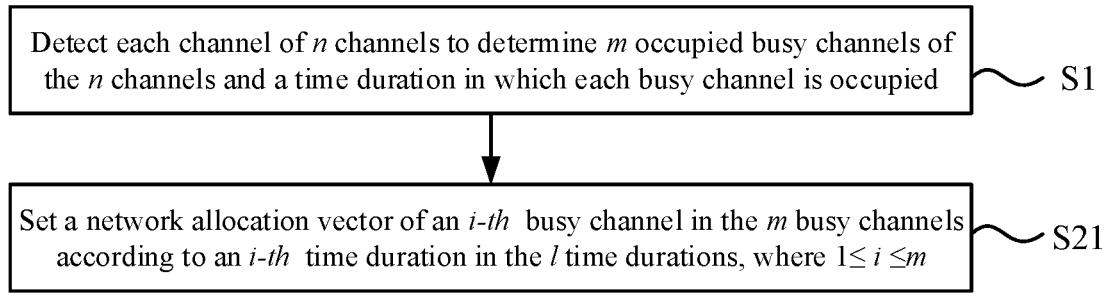
FIG. 2 is a schematic flow chart of another network allocation vector setting method illustrated according to an example of the disclosure.

FIG. 2 is a schematic flow chart of another network allocation vector setting method illustrated according to an example of the disclosure. As shown in FIG. 2, the network allocation vector setting method may include the following steps. In step S1, each channel of then channels is detected to determine m occupied busy channels of the n channels and a time duration in which each busy channel is occupied.

Then in step S21, a network allocation vector of an i-th busy channel in the m busy channels is set according to an i-th time duration in the l time durations, where $1 \le i \le m$.

In an example, under a condition that the terminal performs asynchronous communication through the n channels, asynchronous communication is performed on the m busy channels of the n channels as well, and the operations of receiving the data or sending the data on each busy channel are not necessarily synchronous, so the terminal may access each channel asynchronously.

Therefore, the network allocation vector of the i-th busy channel in the m busy channels can be set according to the i-th time duration in the l time durations. That is, a time duration in which the i-th busy channel is occupied is determined, i.e. the i-th time duration. Then the network allocation vector of the i-th busy channel may be set according to the i-th time duration, such that the network allocation vector of the i-th busy channel corresponds to the time duration in which the channel is occupied. This is conducive to ensuring that the terminal may wait for a proper time duration based on the configured network allocation vector, for instance. When it retries to access the i-th busy channel after waiting for the i-th time duration, the channel is no longer busy, so timely accessing the channel for communication is ensured.

Figure 3:
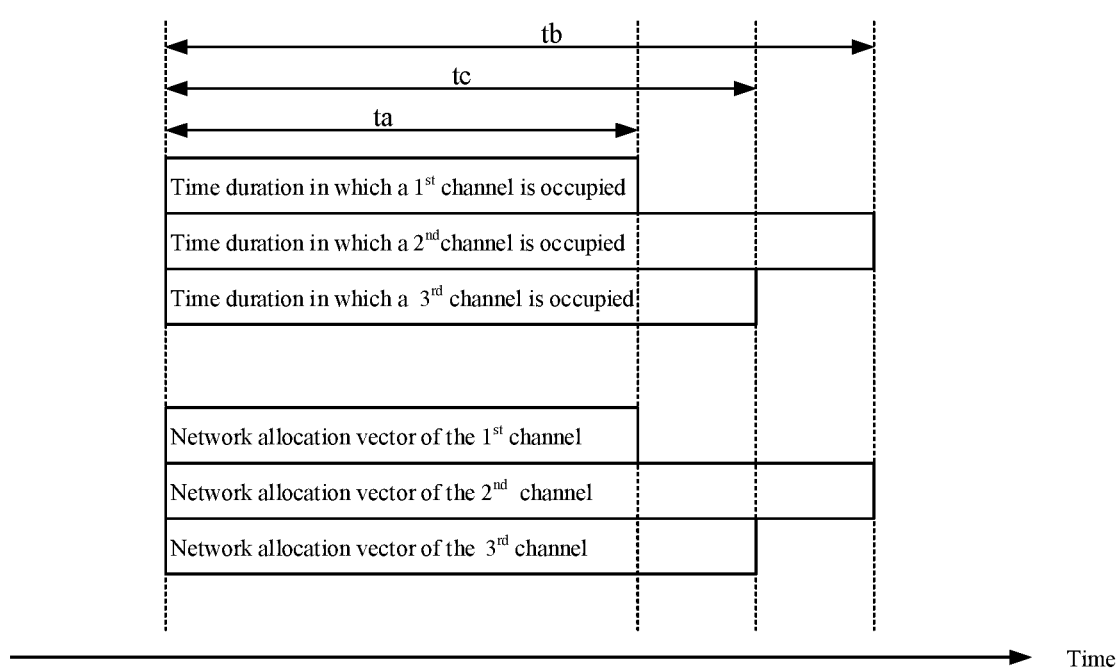
FIG. 3 is a schematic diagram of a relationship between an occupied time duration and a network allocation vector illustrated according to an example of the disclosure.

FIG. 3 is a schematic diagram of a relationship between an occupied time duration and a network allocation vector illustrated according to an example of the disclosure. As shown in FIG. 3, for instance, n=m=3, where a time duration in which a $1^{st}$ channel is occupied is ta, a time duration in which a $2^{nd}$ channel is occupied is tb, and a time duration in which a $3^{rd}$ channel is occupied is tc. A network allocation vector of the $1^{st}$ channel may be set to be NAVa based on ta, a network allocation vector of the $2^{nd}$ channel may be set to be NAVb based on tb, and a network allocation vector of the $3^{rd}$ channel may be set to be NAVc based on tc.

For instance, the terminal may determine, based on the network allocation vector NAVa, a waiting time duration before it retries to access the $1^{st}$ channel next time. For instance, the waiting time duration is ta, the $1^{st}$ channel is no longer occupied after waiting for ta, and the terminal may successfully access the $1^{st}$ channel after trying to access (i.e. monitoring whether the channel is occupied) the $1^{st}$ channel, so the $1^{st}$ channel is rapidly occupied, thus ensuring that the terminal timely occupies the $1s^t$ channel for communication. Similarly, it may further be ensured that the terminal timely occupies the $2^{nd}$ channel and the $3^{rd}$ channel for communication, consequently ensuring a relatively high utilization rate of the three channels as a whole. Optionally, the terminal performs synchronous communication through the n channels.

In an example, the terminal may perform synchronous communication through the n channels. For instance, taking n=3 for example, the terminal may access channels of three frequency bands simultaneously, and operations of sending data on each channel may be performed synchronously. For instance, the terminal may serve as the sending end to send the data under a plurality of channels at a same moment, and the operations of receiving the data on each channel may be performed synchronously. For instance, the terminal may serve as the receiving end to receive the data under the plurality of channels at the same moment. Starting moment of receiving the data may be the same, and ending moments of receiving the data may be the same as well.

Figure 4:
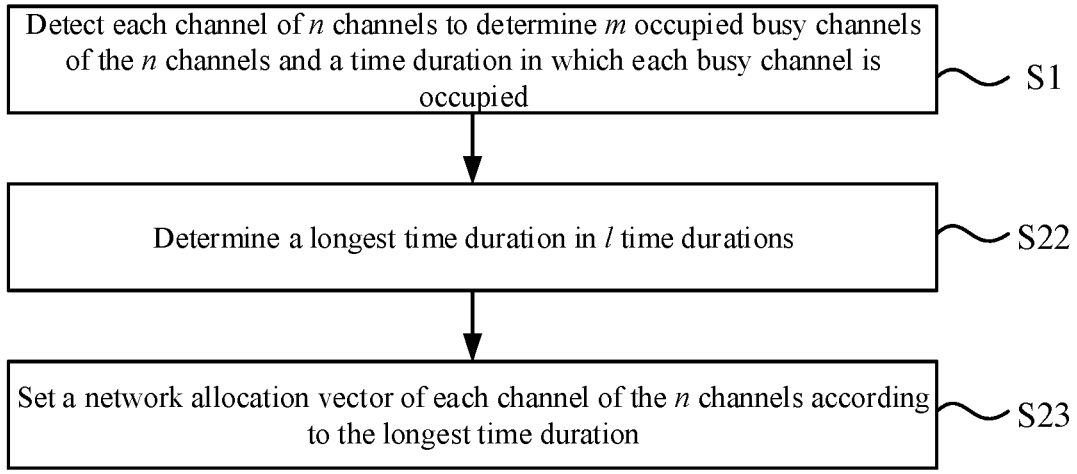
FIG. 4 is a schematic flow chart of yet another network allocation vector setting method illustrated according to an example of the disclosure.

FIG. 4 is a schematic flow chart of yet another network allocation vector setting method illustrated according to an example of the disclosure. As shown in FIG. 4, the network allocation vector setting method may include the same S1 as described previously in relation to FIG. 1.

Then in step S22, a longest time duration in the l time durations is determined. Finally, in step S23, a network allocation vector of each channel of then channels is set according to the longest time duration.

In an example, under a condition that the terminal performs synchronous communication through the n channels, synchronous communication is performed on the m busy channels of the n channels as well. The operations of receiving the data or sending the data on each busy channel need to be synchronous, and it needs to be ensured that the terminal accesses each channel simultaneously.

Under the condition, the longest time duration in the l time durations may be determined first, and then the network allocation vector of each channel in the n channels is set according to the longest time duration, so the network allocation vector of each channel in the n channels corresponds to the longest time duration, thus ensuring that the terminal waits for the longest time duration for each channel before retrying to access the channel. In this way, it is determined that when the terminal reties to access the channel, it has complete data sending or receiving on all busy channels, and when it retries to access the channel, it may access all the channels simultaneously. Data sending or receiving is performed synchronously, thus to ensure that the terminal performs synchronous communication on the n channels.

Figure 5:
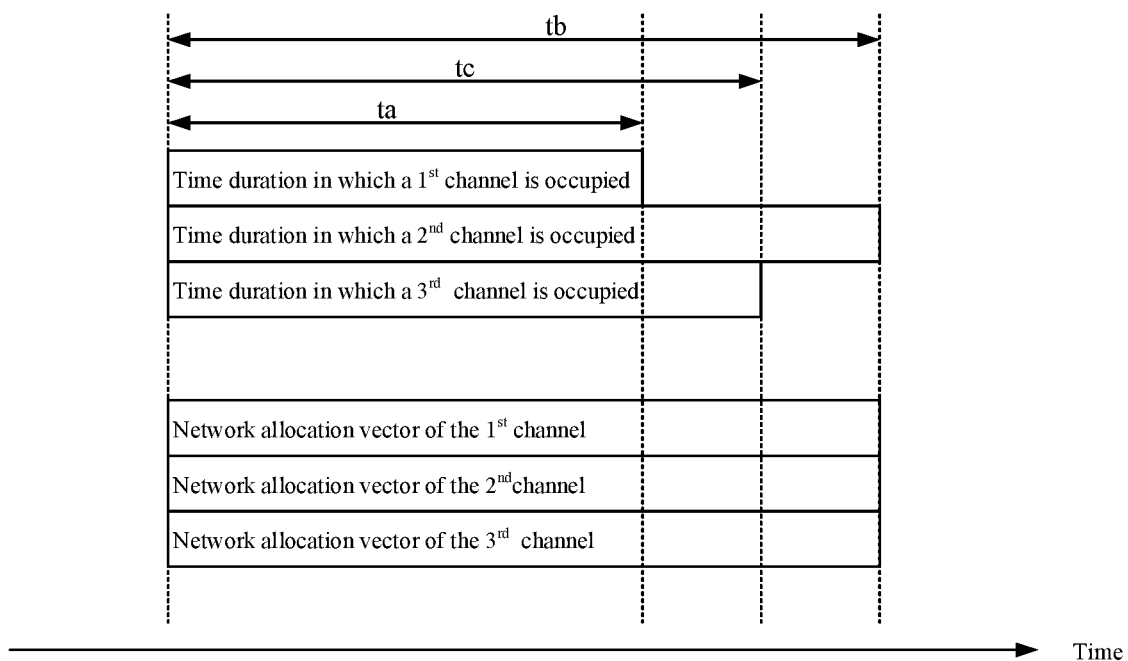
FIG. 5 is a schematic diagram of another relationship between an occupied time duration and a network allocation vector illustrated according to an example of the disclosure.

FIG. 5 is a schematic diagram of another relationship between an occupied time duration and a network allocation vector illustrated according to an example of the disclosure. As shown in FIG. 5, for instance, n=m=3, where the time duration in which the $1^{st}$ channel is occupied is ta, the time duration in which the $2^{nd}$ channel is occupied is tb, the time duration in which the $3^{rd}$ channel is occupied is tc, and tb is the longest time duration. Based on tb, the network allocation vector of the $1^{st}$ channel may be set to be NAVa, the network allocation vector of the $2^{nd}$ channel may be set to be NAVb, and the network allocation vector of the $3^{rd}$ channel may be set to be NAVc.

The terminal determines, based on the network allocation vector NAVa, that the waiting time duration before it tries to access the $1^{st}$ channel next time is tb, determines, based on the network allocation vector NAVb, that the waiting time duration before it tries to access the $2^{nd}$ channel next time is tb, and determines, based on the network allocation vector NAVc, that the waiting time duration before it tries to access the $3^{rd}$ channel next time is also tb. When the terminal retries to access the three channels after waiting for tb, the terminal just completes communication on the $2^{nd}$ channel where the occupied time duration is the longest; and after the terminal accesses the three channels, it may be ensured that communication on the three channels next time can be performed simultaneously and that the waiting time duration is not excessively long.

Figure 6:
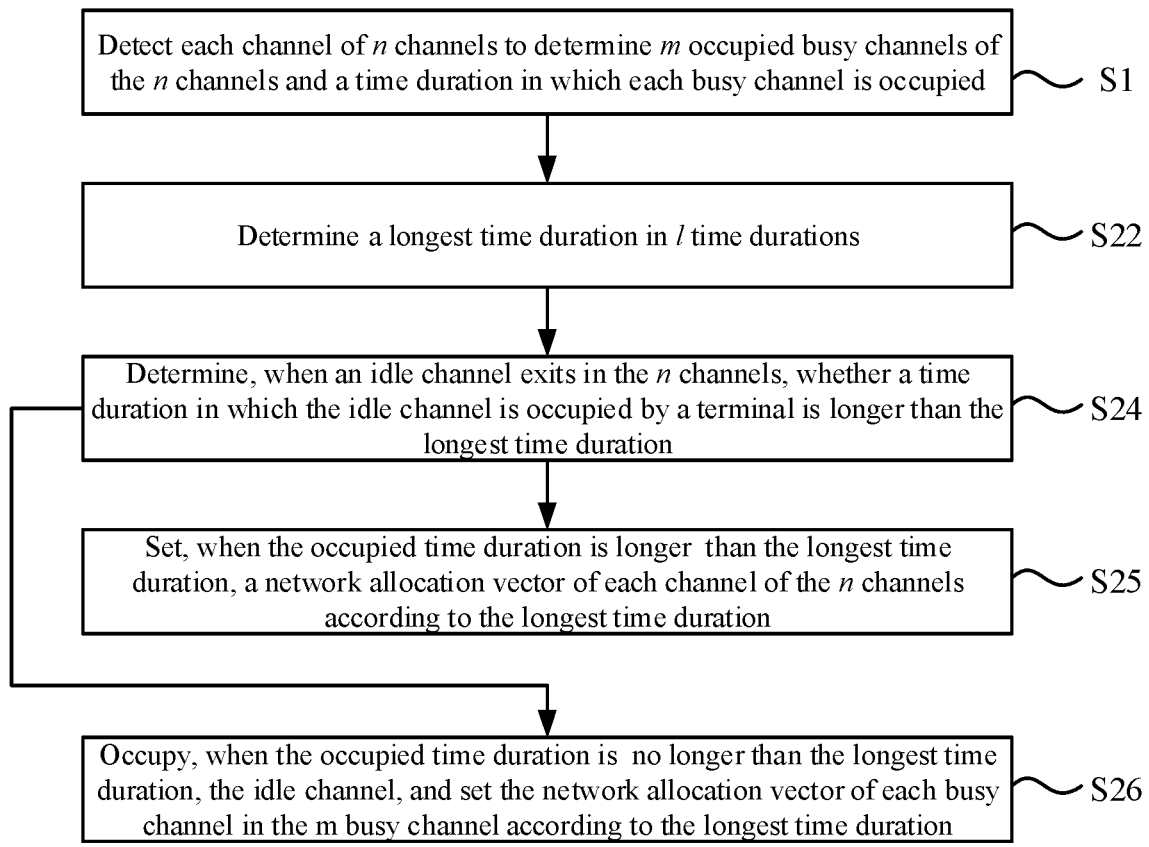
FIG. 6 is a schematic flow chart of yet another network allocation vector setting method illustrated according to an example of the disclosure.

FIG. 6 is a schematic flow chart of yet another network allocation vector setting method illustrated according to an example of the disclosure. As shown in FIG. 6, the network allocation vector setting method may include the same S1 as described previously in relation to FIG. 1.

Then, in step S22, the longest time duration in the l time durations is determined. Next, in step 24, when an idle channel exits in the n channels, determine whether a time duration in which the idle channel is occupied by the terminal is longer than the longest time duration. When the determination is yes, move to step S25. When the determination is no, move to step S26.

In step S25, when the occupied time duration is longer than the longest time duration, a network allocation vector of each channel of the n channels is set according to the longest time duration.

As an alternative, in step S26, when the occupied time duration is no longer than the longest time duration, the idle channel is occupied, and the network allocation vector of each busy channel in the m busy channel is set according to the longest time duration.

In an example, under the condition that the terminal performs synchronous communication through the n channels, synchronous communication is performed on the m busy channels of the n channels as well. The operations of receiving the data or sending the data on each busy channel need to be synchronous, and it needs to be ensured that the terminal accesses each channel simultaneously.

Under a condition that the m busy channels exit in the n channels, the idle channel, i.e. a channel that is not occupied by other devices, may also exit in the n channels, and the terminal may occupy the channel to perform communication through the idle channel. Under the condition, the longest time duration in the l time durations may be determined, and whether the time duration in which the idle channel is occupied is longer than the longest time duration is determined.

When the occupied time duration is longer than the longest time duration, after waiting for the longest time duration, the terminal may try occupying the m busy channels again, but when the terminal is still performing communication through the idle channel, at the moment, even if it can successfully occupy the m busy channels (for instance, under a condition of determining that the busy channels are not occupied), it cannot be ensured that synchronous communication is performed on the m busy channels and the idle channel.

In the example, the network allocation vector of each channel of the n channels may be set according to the longest time duration, i.e. the network allocation vectors are set according to the longest time duration for both the m busy channels and the idle channel, so for the idle channel, the terminal does not occupy the idle channel immediately. Instead, it waits for the longest time duration, and occupies the idle channel when trying to occupy the m busy channels again. When it can successfully occupy the m busy channels, it may occupy the m busy channels and the idle channel simultaneously, i.e. occupy then channels simultaneously, so it may perform synchronous communication on the n channels.

When the occupied time duration is shorter than or equal to the longest time duration, even if the terminal performs communication through the idle channel, after waiting for the longest time duration, the terminal completes current communication through the idle channel, so it may occupy the idle channel again subsequently when it occupies other channels.

In the example, the idle channel may be occupied first, and the network allocation vector of each busy channel in the m busy channels may be set according to the longest time duration. For each busy channel in the m busy channels, the terminal may wait for the longest time duration before retrying to occupy, which is conducive to ensuring that the m busy channels are occupied simultaneously. Because the occupied time duration for the idle channel is shorter than or equal to the longest time duration, after waiting for the longest time duration, the terminal completes current communication through the idle channel. As a result, when it occupies them busy channels simultaneously, it may also occupy the idle channel again at the same time, consequently achieving synchronous communication on the n channels. It may be achieved that the terminal can timely occupy the idle channel to perform communication, a communication latency of corresponding business of the idle channel is reduced, and it can be ensured to a certain extent that the terminal performs synchronous communication on the n channels.

Figure 7:
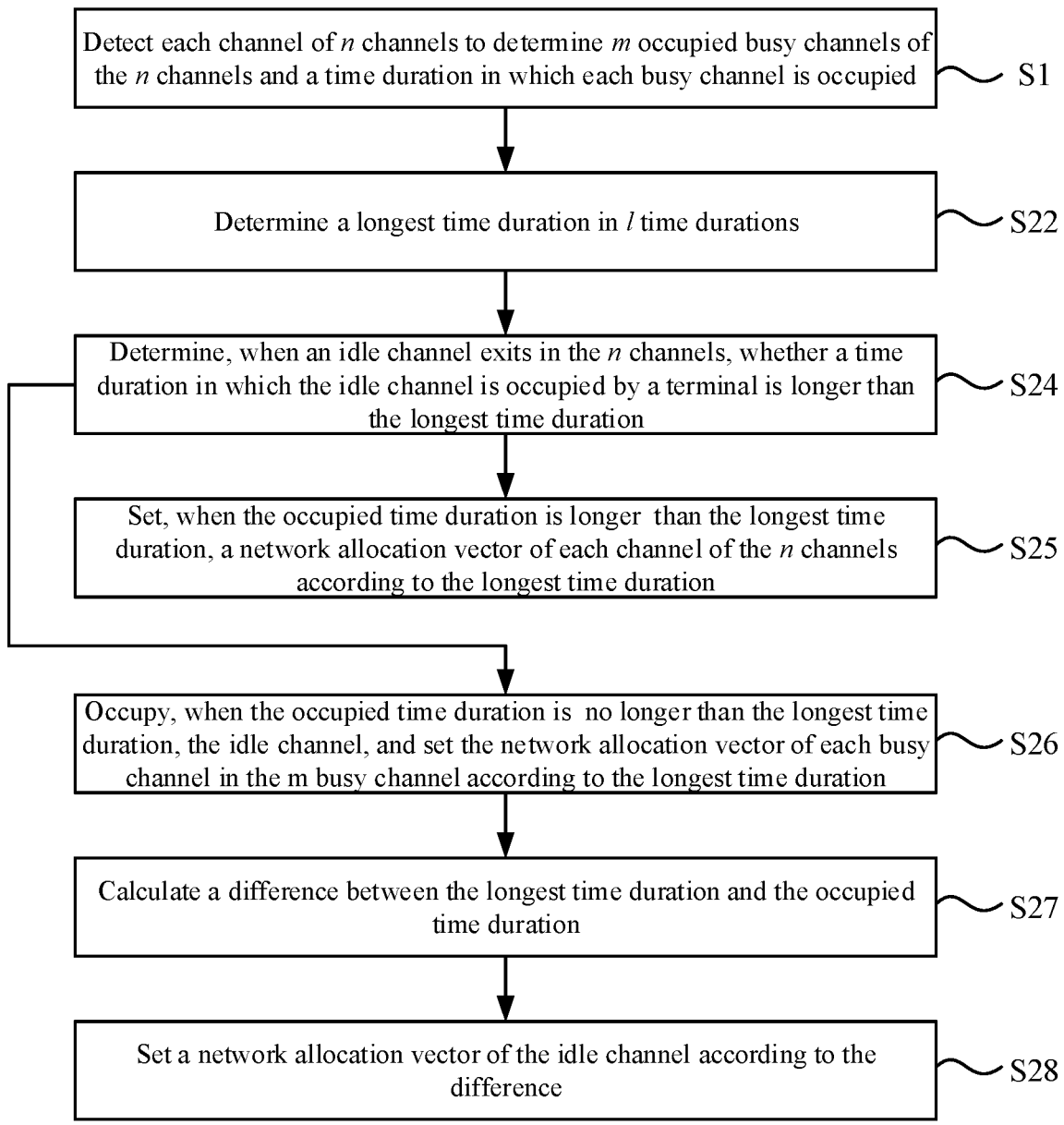
FIG. 7 is a schematic flow chart of yet another network allocation vector setting method illustrated according to an example of the disclosure.

FIG. 7 is a schematic flow chart of yet another network allocation vector setting method illustrated according to an example of the disclosure. As shown in FIG. 7, the network allocation vector setting method may include the same step S1 as described previously in relation to FIG. 1 and steps S22-S26 as described previously in relation to FIG. 6. When the execution of step S25 is completed, the process ends.

The network allocation vector setting method may further include the following steps. In step S27, a difference between the longest time duration and the occupied time duration is calculated. Then, in step S28, a network allocation vector of the idle channel is set according to the difference.

In an example, under the condition that the occupied time duration is no longer than the longest time duration, the terminal may occupy the idle channel. In the example, the network allocation vector NAV0 of the idle channel may be set according to the difference between the longest time duration and the occupied time duration, and a time duration before retrying to occupy the idle channel determined by the terminal according to NAV0 may be equal to the difference between the longest time duration and the occupied time duration.

For instance, the longest time duration is tb, the occupied time duration is t0, the difference between the longest time duration and the occupied time duration is tb−t0, and after the terminal occupies the idle channel for t0, it may wait for tb−t0 before retrying to occupy the idle channel. A time duration from the terminal starting occupying the idle channel to retrying to occupy the idle channel is tb, i.e. the longest time duration, equaling the time duration in which the terminal waits before retrying to occupy the m busy channels.

Accordingly, it may be ensured that when the terminal retries to occupy the m busy channels, the terminal also retries to occupy the idle channel, so that the terminal occupies the m busy channels and the idle channel to perform synchronous communication.

Corresponding to the aforesaid example of the network allocation vector setting method, the disclosure further provides an example of a network allocation vector setting apparatus.

Figure 8:
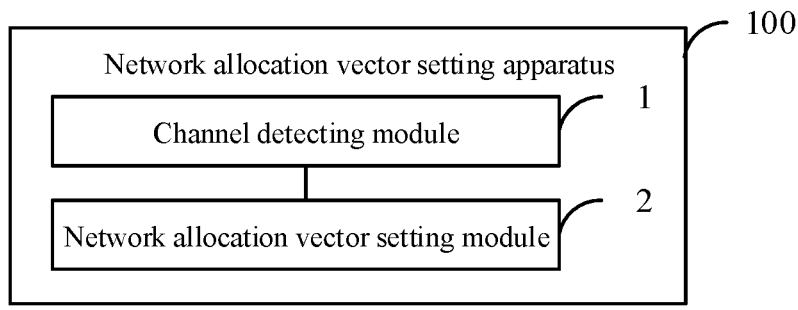
FIG. 8 is a schematic block diagram of a network allocation vector setting apparatus illustrated according to an example of the disclosure.

FIG. 8 is a schematic block diagram of a network allocation vector setting apparatus illustrated according to an example of the disclosure. The network allocation vector setting apparatus 100 illustrated by the example may be applicable to a terminal. The terminal may be an electronic device such as a mobile phone, a tablet computer, a wearable device, etc., and the terminal may perform communication based on a Wi-Fi network.

The Wi-Fi network may have n channels, and the terminal may access the n channels simultaneously. Each channel of the n channels may be in a different frequency band. For instance, taking n=3 for example, the frequency bands of 3 channels may be 2.4 GHz, 5.8 GHz and 6 GHz respectively.

As shown in FIG. 8, the network allocation vector setting apparatus 100 may include a channel detecting module 1, configured to detect each channel of the n channels to determine m occupied busy channels of the n channels and a time duration in which each busy channel is occupied.

The network allocation vector setting apparatus 100 further includes a network allocation vector setting module 2, configured to set network allocation vectors of at least the m busy channels of the n channels according to l time durations, where $1 \leq l \leq n$.

The channel detecting module may correspond to structures such as a radio frequency antenna or a receiver in the terminal, and the network allocation vector setting module may correspond to structures such as a baseband and a processor in the terminal.

Optionally, the terminal performs asynchronous communication through the n channels.

Optionally, the network allocation vector setting module is configured to set a network allocation vector of an i-th busy channel in them busy channels according to an i-th time duration in the l time durations, where $1 \leq i \leq m$.

Optionally, the terminal performs synchronous communication through the n channels.

FIG. 9 is a schematic block diagram of a network allocation vector setting module illustrated according to an example of the disclosure. As shown in FIG. 9, the network allocation vector setting module 2 includes a time duration determining sub-module 21, configured to determine a longest time duration in the l time durations Further, the network allocation vector setting module 2 includes a setting sub-module 22, configured to set a network allocation vector of each channel of the n channels according to the longest time duration.

FIG. 10 is a schematic block diagram of another network allocation vector setting module illustrated according to an example of the disclosure. As shown in FIG. 10, the network allocation vector setting module includes the time duration determining sub-module 21, configured to determine the longest time duration in the l time durations. A time duration comparing sub-module 23, configured to determine, under a condition that an idle channel exits in then channels, whether a time duration in which the idle channel is occupied by the terminal is longer than the longest time duration.

Further, the network allocation vector setting module 2 includes the setting sub-module 22, configured to set, under a condition that the occupied time duration is longer than the longest time duration, the network allocation vector of each channel of the n channels according to the longest time duration; and to set, under a condition that the occupied time duration is no longer than the longest time duration, a network allocation vector of each busy channel in the m busy channels according to the longest time duration. Also included is a channel occupying sub-module 24, configured to occupy, under the condition that the occupied time duration is no longer than the longest time duration, the idle channel.

FIG. 11 is a schematic block diagram of yet another network allocation vector setting module illustrated according to an example of the disclosure. As shown in FIG. 11, the network allocation vector setting module 2 as shown in FIG. 10 and further includes a difference calculating sub-module 25, configured to calculate, under the condition that the occupied time duration is no longer than the longest time duration, a difference between the longest time duration and the occupied time duration.

The setting sub-module 22 is configured to set a network allocation vector of the idle channel according to the difference.

For the apparatus in the above example, specific modes of the modules in executing operations have been described in detail in the examples of relevant methods, and no detailed description is made here.

With regard to the apparatus examples, because they basically correspond to the method examples, for correlated parts, reference may be made to the part of description in the method examples. The apparatus examples described above are illustrative. Modules described as separate components may or may not be physically separated, and components displayed as the modules may or may not be physical modules, that is, they may be located in one place, or they may be distributed to a plurality of network modules. Some or all of the modules may be selected according to actual needs to achieve the objectives of the solutions of the examples. Those of ordinary skill in the art can understand and implement without creative labor.

An example of the disclosure further provides an electronic device, including a processor a memory used for storing an instruction executable by the processor. The processor is configured to realize the method according to any one of the above examples.

An example of the disclosure further provides a non-transitory computer readable storage medium, storing a computer program thereon. The program, when being executed by a processor, realizes steps in the method according to any one of the above examples.

FIG. 12 is a schematic block diagram of an apparatus 1200 for network allocation vector setting illustrated according to an example of the disclosure. For instance, the apparatus 1200 may be a mobile phone, a computer, a digital broadcast terminal, a messaging device, a game console, a tablet device, a medical device, a fitness device, a personal digital assistant, and the like.

With reference to FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls overall operations of the apparatus 1200, such as operations associated with display, telephone calls, data communication, camera operations, and recording operations. The processing component 1202 may include one or a plurality of processors 1220 to execute instructions to complete all or part of steps of the above method. In addition, the processing component 1202 may include one or a plurality of modules to facilitate interaction between the processing component 1202 and other components. For instance, the processing component 1202 may include a multimedia module to facilitate interaction between the multimedia component 1208 and the processing component 1202.

The memory 1204 is configured to store various types of data to support operations on the apparatus 1200. Instances of these data include instructions for any application program or method operating on the apparatus 1200, contact data, phone book data, messages, pictures, videos, etc. The memory 1204 may be implemented by any type of volatile or non-volatile storage devices or their combination, such as a static random access memory (SRAM), an electrically erasable programmable read-only memory (EEPROM), an erasable Programmable read-only memory (EPROM), a programmable read-only memory (PROM), a read-only memory (ROM), a magnetic memory, a flash memory, a magnetic disk or an optical disk.

The power supply component 1206 provides power to various components of the apparatus 1200. The power supply component 1206 may include a power management system, one or a plurality of power supplies, and other components associated with generation, management, and distribution of the power for the apparatus 1200.

The multimedia component 1208 includes a screen that provides an output interface between the apparatus 1200 and a user. In some examples, the screen may include a liquid crystal display (LCD) and a touch panel (TP). When the screen includes the touch panel, the screen may be implemented as a touch screen to receive input signals from the user. The touch panel includes one or a plurality of touch sensors to sense touch, wipe, and gestures on the touch panel. The touch sensor may not only sense a boundary of a touch or wipe action, but also detect a duration and pressure related to the touch or wipe operation. In some examples, the multimedia component 1208 includes a front camera and/or a rear camera. When the apparatus 1200 is in an operation mode, such as a shooting mode or a video mode, the front camera and/or the rear camera may receive external multimedia data. Each front camera and rear camera may be a fixed optical lens system or have focal length and optical zoom capabilities.

The audio component 1210 is configured to output and/or input audio signals. For instance, the audio component 1210 includes a microphone (MIC). When the apparatus 1200 is in the operation mode, such as a call mode, a recording mode, and a voice recognition mode, the microphone is configured to receive external audio signals. The received audio signal may be further stored in the memory 1204 or sent via the communication component 1216. In some examples, the audio component 1210 further includes a speaker for outputting audio signals.

The I/O interface 1212 provides an interface between the processing component 1202 and a peripheral interface module. The above peripheral interface module may be a keyboard, a click wheel, buttons, and the like. These buttons may include but are not limited to: a home button, a volume button, a start button, and a lock button.

The sensor component 1214 includes one or a plurality of sensors to provide the apparatus 1200 with various aspects of status assessment. For instance, the sensor component 1214 may detect an on/off status of the apparatus 1200 and relative positioning of a component. For instance, the component is a display and a keypad of the apparatus 1200. The sensor component 1214 may also detect a position change of the apparatus 1200 or a component of the apparatus 1200, presence or absence of contact between the user and the apparatus 1200, orientation or acceleration/deceleration of the apparatus 1200, and a temperature change of the apparatus 1200. The sensor component 1214 may include a proximity sensor configured to detect presence of a nearby object when there is no physical contact. The sensor component 1214 may also include a light sensor, such as a CMOS or CCD image sensor, for use in imaging applications. In some examples, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and other devices. The apparatus 1200 may access a wireless network based on a communication standard, such as WiFi, 2G or 3G, 4G LTE, 5G NR, or a combination of them. In an example, the communication component 1216 receives a broadcast signal or broadcast related information from an external broadcast management system via a broadcast channel. In an example, the communication component 1216 further includes a near field communication (NFC) module to facilitate short-range communication. For instance, the NFC module may be implemented based on radio frequency identification (RFID) technology, infrared data association (IrDA) technology, ultra-wideband (UWB) technology, Bluetooth (BT) technology and other technologies.

In an example, the apparatus 1200 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components, so as to execute the method according to any one of the above examples.

In an example, a non-transitory computer readable storage medium including instructions is further provided, for instance, the memory 1204 including the instructions. The above instructions may be executed by the processor 1220 of an apparatus 1200 to complete the above method. For instance, the non-transitory computer readable storage medium may be a ROM, a random access memory (RAM), a CD-ROM, a magnetic tape, a floppy disk, an optical data storage device, etc.

After considering the specification and practicing the disclosure disclosed herein, those of skill in the art will easily think of other examples of the disclosure. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The specification and the examples are to be regarded as illustrative.

It should be understood that the disclosure is not limited to a precise structure that has been described above and shown in the drawings, and various modifications and changes can be made without departing from its scope.

It should be noted that, relational terms herein such as first and second are used to distinguish one entity or operation from another entity or operation, and do not necessarily require or imply any such actual relationship or sequence between these entities or operations. The terms "include", "comprise" or any other variants of them are intended to cover non-exclusive inclusion, so that a process, method, article or device including a series of elements not only includes those elements, but also includes other elements that are not explicitly listed, or also includes elements inherent to such process, method, article or device. When there are no more restrictions, the element defined by a sentence "including a . . . " does not exclude the existence of other identical elements in the process, method, article or device that includes the element.

The methods and apparatuses provided by the examples of the disclosure are described in detail above. Specific instances are used herein to illustrate the principles and implementations of the disclosure. The descriptions of the above examples are used to facilitate understanding of the methods of the disclosure and core ideas of them. At the same time, for those of ordinary skill in the art, based on the ideas of the disclosure, there will be changes in the specific implementations and the scope of the disclosure. In summary, the content of this specification should not be construed as restrictions to the disclosure.

What is claimed is:

1. A network allocation vector setting method, applicable to a terminal, wherein the terminal is applicable to accessing n channels simultaneously, each channel is in a different frequency band, and the method comprises:
   detecting each channel of the n channels to determine m occupied busy channels of the n channels and a time duration in which each busy channel is occupied; and
   setting network allocation vectors of at least the m busy channels of the n channels according to l time durations, wherein $1 \leq l \leq n$,
   wherein the terminal performs synchronous communication through the n channels,
   wherein setting the network allocation vectors of the at least the m busy channels of the n channels according to the l time durations comprises:
      determining a longest time duration in the l time durations; and
      setting a network allocation vector of each channel of the n channels according to the longest time duration.

2. The method according to claim 1, wherein the terminal performs asynchronous communication through the n channels.

3. The method according to claim 2, wherein setting the network allocation vectors of at least the m busy channels of the n channels according to the l time durations comprises:
   setting a network allocation vector of an i-th busy channel in the m busy channels according to an i-th time duration in the l time durations, wherein $1 \leq i \leq m$.

4. An electronic device, comprising:
   one or more processors; and
   a memory used for storing an instruction executable by the one or more processors;
   wherein the one or more processors are collectively configured:
   detect each channel of n channels to determine m occupied busy channels of the n channels and a time duration in which each busy channel is occupied, wherein the n channels are simultaneously accessible to the electronic device, and each channel is in a different frequency band;
   set network allocation vectors of at least the m busy channels of the n channels according to l time durations, wherein $1 \leq l \leq n$,
   determine a longest time duration in the l time durations; and
   set a network allocation vector of each channel of the n channels according to the longest time duration,
   wherein the electronic device performs synchronous communication through the n channels.

5. The electronic device according to claim 4, wherein the electronic device performs asynchronous communication through the n channels.

6. The electronic device according to claim 5, wherein the one or more processors are further collectively configured to set a respective network allocation vector of an i-th busy channel in the m busy channels according to an i-th time duration in the l time durations, wherein $1 \le i \le m$.

7. A non-transitory computer readable storage medium, storing a computer program, the computer program that when executed by a processor causes the processor to perform a method comprising:
  detecting each channel of n channels to determine m occupied busy channels of the n channels and a time duration in which each busy channel is occupied, wherein the n channels are simultaneously accessible to a terminal, and each channel is in a different frequency band;
  setting network allocation vectors of at least the m busy channels of the n channels according to l time durations, wherein $1 \le l \le n$;
  determining a longest time duration in the l time durations; and
  setting a network allocation vector of each channel of the n channels according to the longest time duration,
  wherein the terminal performs synchronous communication through the n channels.

8. The non-transition computer readable storage medium according to claim 7, wherein the terminal performs asynchronous communication through the n channels.

9. The non-transition computer readable storage medium according to claim 8, wherein the method further comprises:
  setting a network allocation vector of an i-th busy channel in the m busy channels according to an i-th time duration in the l time durations, wherein $1 \le i \le m$.

* * * * *